United States Patent [19]

Christiansen et al.

[11] Patent Number: 4,548,347

[45] Date of Patent: Oct. 22, 1985

[54] AUTOMATED FUEL PIN LOADING SYSTEM

[75] Inventors: David W. Christiansen, Kennewick; William F. Brown, West Richland; Jim M. Steffen, Richland, all of Wash.

[73] Assignee: The United States of America as represented by the United States Department of Energy, Washington, D.C.

[21] Appl. No.: 445,640

[22] Filed: Nov. 30, 1982

[51] Int. Cl.⁴ .............................................. G21C 3/02
[52] U.S. Cl. ........................................ 228/48; 29/723; 198/339.1; 228/47; 376/261; 414/748; 414/146
[58] Field of Search ........................ 228/48, 47, 221; 29/723, 400 N; 414/146, 748, 431; 53/260; 376/261; 198/339

[56] References Cited

U.S. PATENT DOCUMENTS

| | | | |
|---|---|---|---|
| 2,983,137 | 5/1961 | Lombard | 414/748 X |
| 3,711,993 | 1/1973 | Liesch et al. | 376/260 X |
| 3,746,190 | 7/1973 | Hotz | 414/146 |
| 3,749,258 | 7/1973 | James | 53/260 X |
| 3,828,518 | 8/1974 | Silk et al. | 228/29 X |
| 3,907,123 | 9/1975 | Howell | 414/292 |
| 4,063,962 | 12/1977 | Arya et al. | 134/8 |
| 4,070,240 | 1/1978 | Kugler et al. | 376/315 X |
| 4,125,557 | 11/1978 | Bezold | 376/264 X |
| 4,158,601 | 6/1979 | Gerkey | 414/146 |
| 4,167,959 | 9/1979 | Weichselgärtner et al. | 141/392 |
| 4,174,938 | 11/1979 | Cellier | 425/317 |
| 4,252,039 | 2/1981 | Wittler et al. | 414/431 X |
| 4,289,443 | 9/1981 | Jacob | 414/748 |
| 4,292,788 | 10/1981 | King | 53/148 X |

FOREIGN PATENT DOCUMENTS 2900865  7/1979  Fed. Rep. of Germany ...... 376/261

Primary Examiner—Kenneth J. Ramsey
Attorney, Agent, or Firm—Edward W. Nypaver; Robert Southworth, III; Judson R. Hightower

[57] ABSTRACT

An automated loading system for nuclear reactor fuel elements utilizes a gravity feed conveyor which permits individual fuel pins to roll along a constrained path perpendicular to their respective lengths. The individual lengths of fuel cladding are directed onto movable transports, where they are aligned coaxially with the axes of associated handling equipment at appropriate production stations. Each fuel pin can be reciprocated axially and/or rotated about its axis as required during handling steps. The fuel pins are inserted as a batch prior to welding of end caps by one of two disclosed welding systems.

9 Claims, 29 Drawing Figures

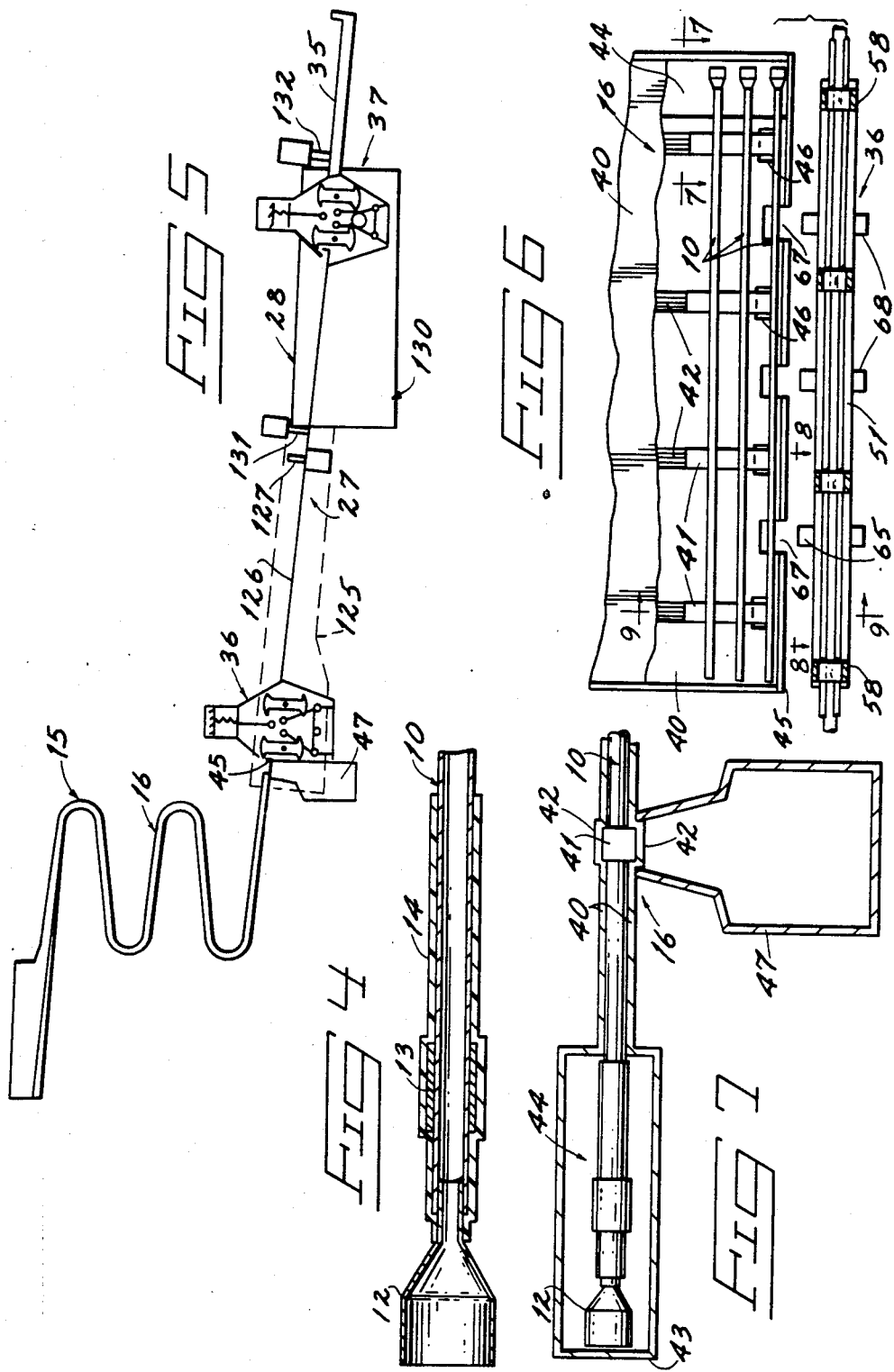

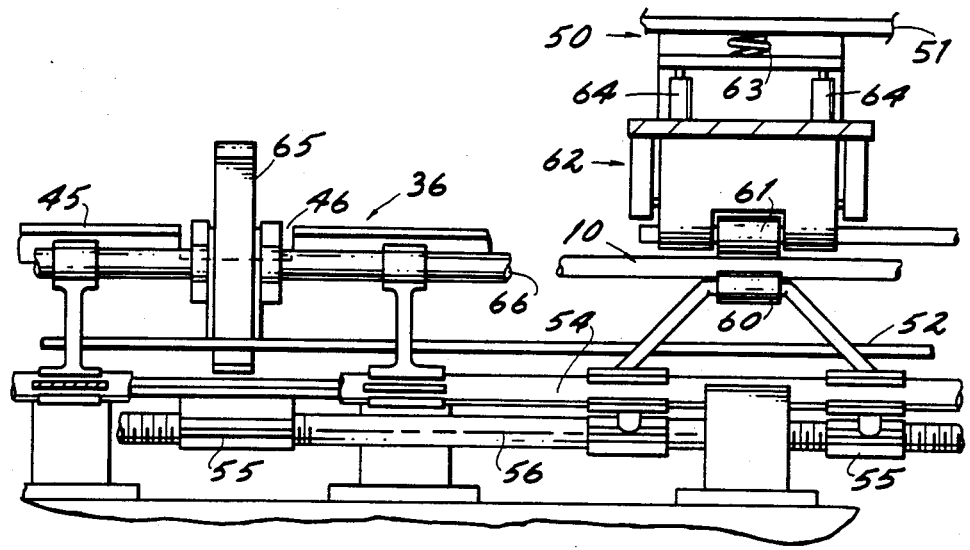

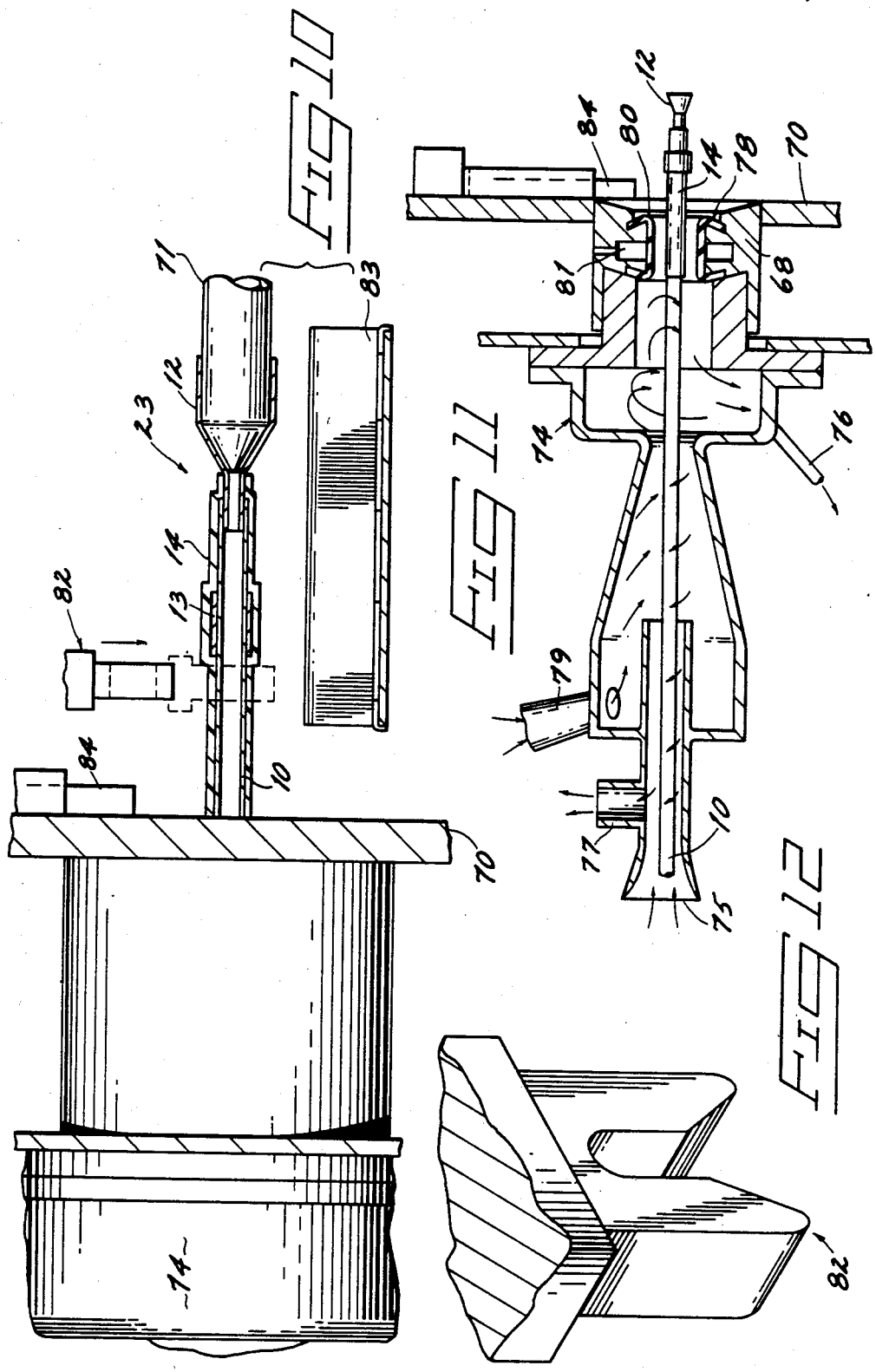

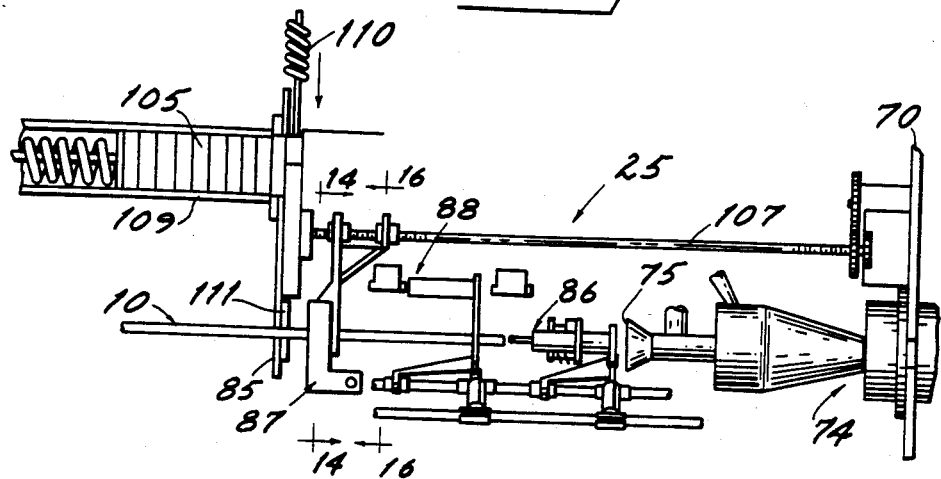
FIG 13
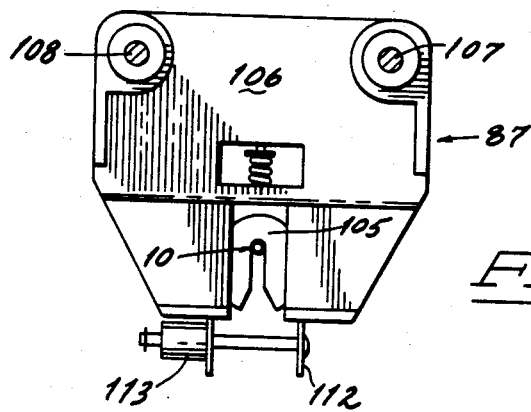
FIG 14
FIG 15
FIG 16

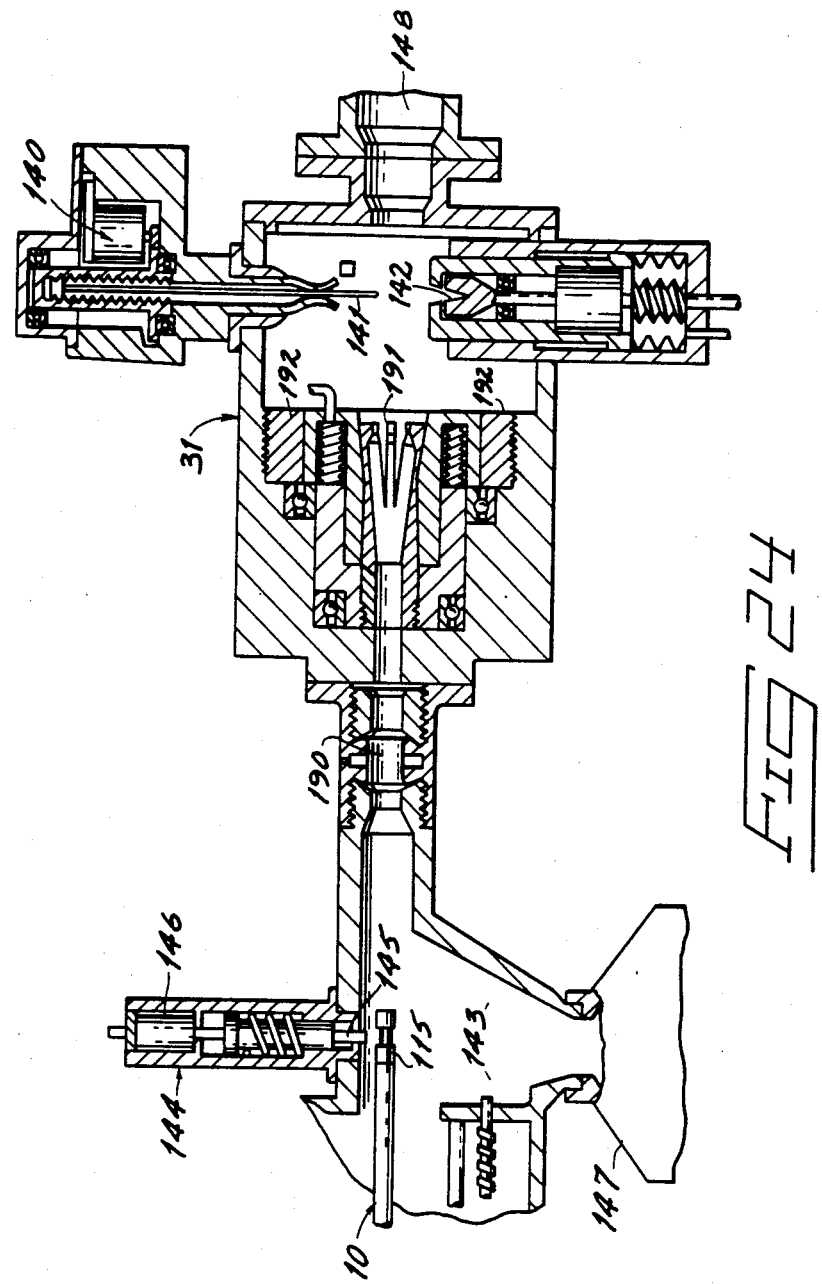

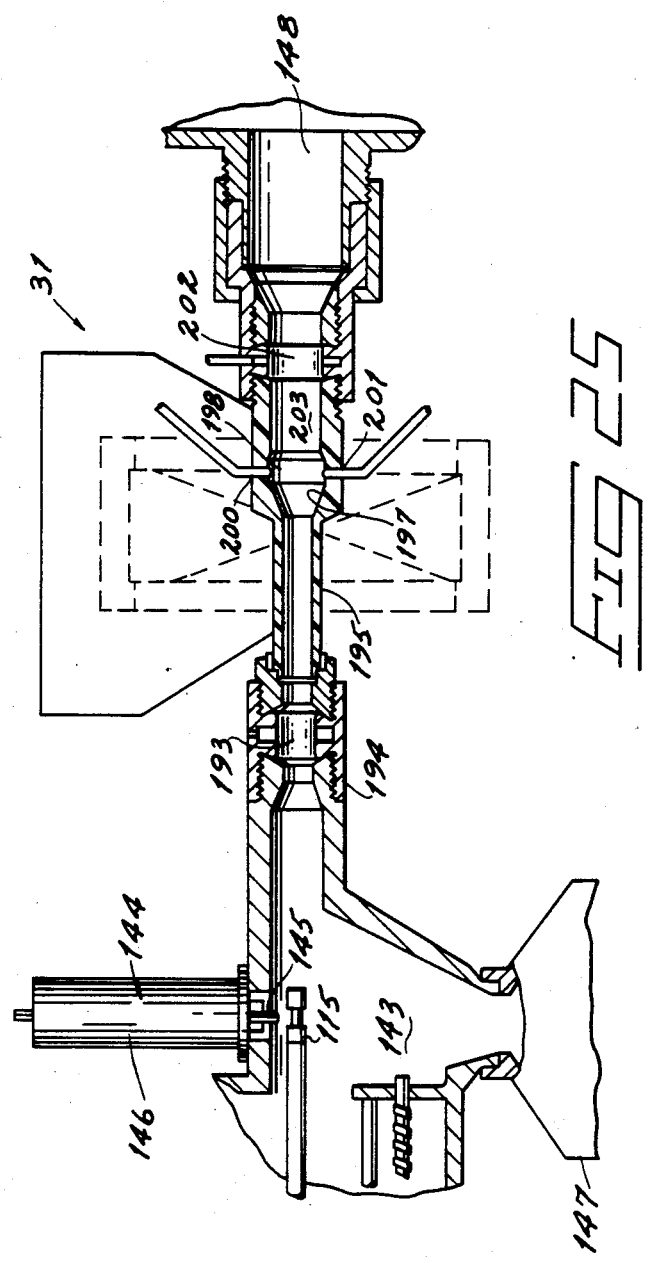

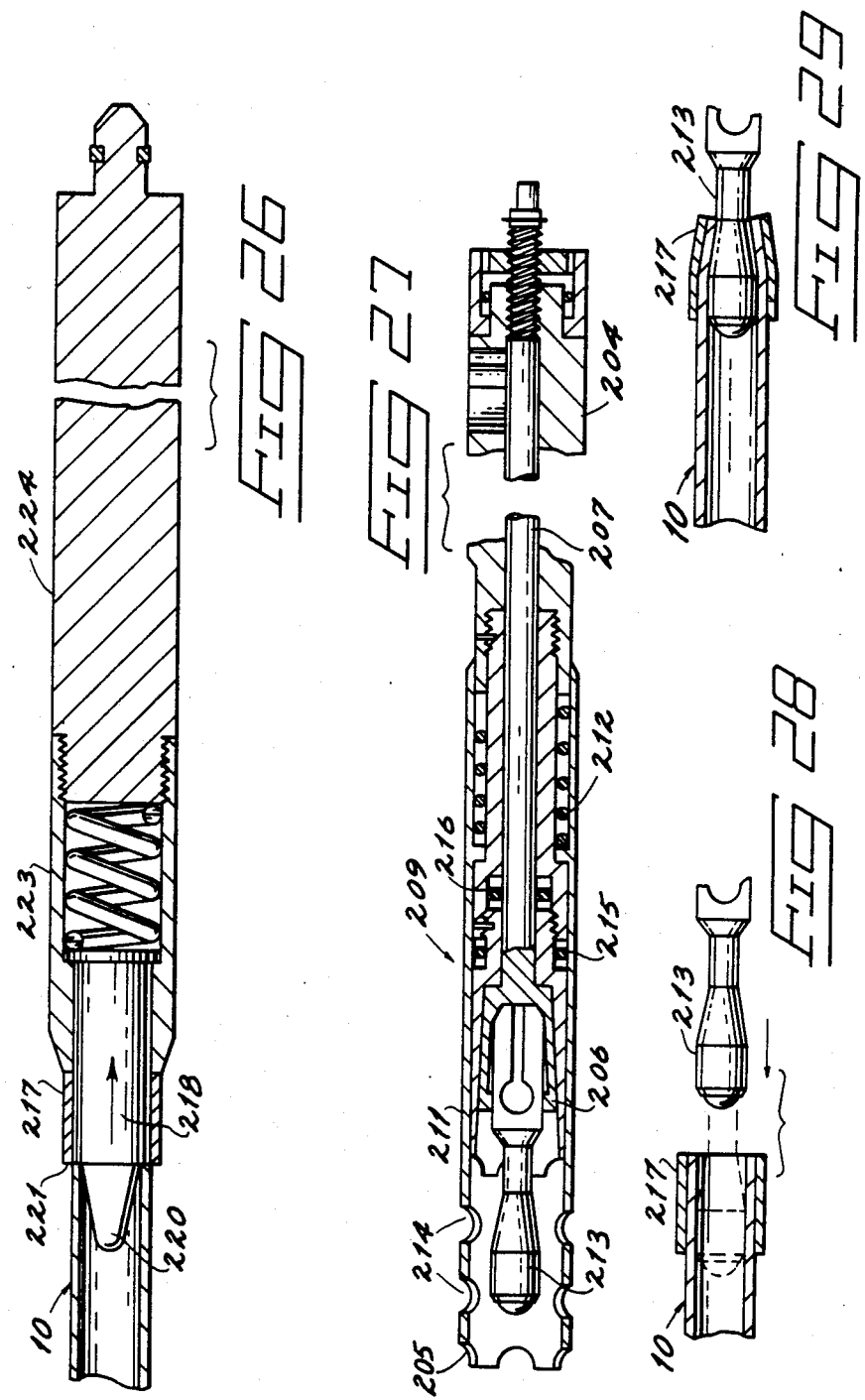

AUTOMATED FUEL PIN LOADING SYSTEM

BACKGROUND OF THE INVENTION

The present invention relates generally to automated loading of fuel assemblies for nuclear reactors. It comprises a conveying and handling apparatus for carrying out the several steps required to safely and efficiently load fuel pins in commercial quantities. The United States government has rights in this invention pursuant to Contract DE-AC14-76FF02170 between the U.S. Department of Energy and Westinghouse Electric Corporation.

This disclosure relates to the assembly of nuclear fuel assemblies, particularly for use in fast breeder reactors. The present state of the art involves fabrication of fuel assemblies by manual manipulation or by mechanical processes incapable of limiting spread of radioactive contamination to adjoining components and equipment. In such configurations, the fabrication steps are time consuming and create significant radiation contamination control problems.

To achieve flexibility of process steps, radiation contamination control, and efficient fabrication in an apparatus having production capability, the present invention has been directed toward development of a self-contained automated loading system. It allows for system variation and contamination control without degrading production capability. More specifically, the present apparatus permits fabrication of fuel assemblies by batch processing methods, using equipment which can be physically and environmentally isolated as required.

U.S. Pat. No. 4,167,959 exemplifies an apparatus in which a manual glove box is provided for filling fuel rods. A seal is provided at the entrance of the glove box for engaging the cladding. Contamination is stated to be controlled by differences in pressure between an antechamber, a processing chamber, and the exterior of the glove box.

The use of a glove box for processing of nuclear fuel assemblies is carried further in the disclosure of U.S. Pat. No. 4,070,240. The patent discloses an automated transport conveyor for moving fuel elements between successive assembly stations. A common sealing apparatus is stated to prevent external contamination as the fuel elements are advanced between the various manual stations.

A large scale system for manufacturing nuclear fuel pellets is disclosed in U.S. Pat. No. 4,174,938. The system includes process components arranged vertically and providing for gravity flow of the product from one component to the next. The various process components are modular and each can be removed without interfering with the others. Physical isolation of the components is provided by appropriate seals and manual access is accomplished through glove ports. Another large scale system for cleaning nuclear fuel elements is shown in U.S. Pat. No. 4,063,962. Batches of fuel elements are suspended vertically and moved through the components of the system. Airlocks and seals are provided to contain contamination.

A number of prior patents have been directed specifically to sub-systems for loading fuel pellets into nuclear fuel elements by automated or semi-automated equipment. Representative disclosures are found in U.S. Pat. Nos. 3,746,190, 4,125,577, 3,907,123 and 4,158,601.

U.S. Pat. No. 3,711,993 relates to an airlock or cylindrical seal for engagement about the periphery of fuel cladding.

U.S. Pat. No. 3,828,518 discloses a welding apparatus for closing the end of a fuel rod by use of a rotating electrode head.

SUMMARY OF THE INVENTION

It is an object of this invention to provide a novel conveyor and support system for handling a batch of fuel pins during fabrication processes. The system permits batch processing of the fuel pins in combination with individual fabrication steps so as to more efficiently adapt automated fuel pin fabrication processes to a production schedule. More specifically, the system lends itself to batch inerting of the fuel pins in an apparatus interposed between subsystems which individually fill and cap the fuel pins.

Another object of this invention is to provide a system in which the various work stations and subsystems are modular. They can be duplicated when required by production quotas, and individual components can be removed or substituted as necessitated by servicing and repair schedules.

Another object of the invention is to provide an integrated system for fabricating fuel pins which can be totally automated, thereby removing the necessity of using manual glove boxes during fuel pin fabrication.

Another object of the invention is to provide a unique system of handling individual fuel pins by which each fuel pin can be reciprocated axially and rotated about its axis. This eliminates the necessity of rotating work elements used to carry out particular fabrication steps, such as the welding or the cleaning of fuel pin surfaces.

Another object of the invention is to provide a unique system of seals so as to assure effective protection against contamination of vulnerable mechanical components and to permit efficient inerting of the fuel pin interiors.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention as embodied and broadly described herein, the apparatus of this invention may comprise conveyor means for moving parallel fuel pin assemblies along a path perpendicular to their lengths, transport means for coaxially positioning a fuel pin assembly along a preselected operational axis, transfer means for shifting individual fuel pin assemblies between the conveyor means and the transport means, powered means for shifting the transport means relative to the conveyor means in a direction parallel to the operational axis, and fuel pin handling means for receiving one end of a fuel pin assembly shifted thereto by the powered means. By this apparatus, fuel pin assemblies can be moved to and from the transport means by the conveyor means and can be shifted axially for operations carried out by the fuel pin handling means.

The apparatus provides an effective automated system for moving a plurality of fuel pin assemblies between automated production stations including fuel pin handling means by which the fuel pins can be filled, cleaned, inerted, capped and welded. All of these steps can be effectively accomplished without manual intervention.

BRIEF DESCRIPTION OF THE DRAWINGS

The accompanying drawings, which are incorporated into and form a part of the specification, illustrate several embodiments of the present invention and, together with the description, serve to explain the principles of the invention. In the drawings:

FIG. 4 is a cross-sectional axial view along the open end of a prepared fuel pin;

FIG. 5 is a schematic elevational view of the apparatus;

FIG. 6 is a fragmentary plan view of the interface between the conveyor and transport as seen along line 6—6 in FIG. 9;

FIG. 7 is an enlarged fragmentary sectional view taken along line 7—7 in FIG. 6;

FIG. 8 is a fragmentary elevational view of the transport as seen along line 8—8 in FIG. 6;

FIG. 9 is an enlarged cross-sectional view taken along line 9—9 in FIG. 6;

FIG. 10 is a side elevational view of the fuel pin loading station;

FIG. 11 is an axial sectional view through the cyclone valve assembly shown in FIG. 10;

FIG. 12 is an enlarged perspective view of a funnel removal tool;

FIG. 13 is an elevational view of the elements for cleaning the loaded fuel pins;

FIG. 14 is an enlarged elevational sectional view taken along line 14—14 in FIG. 13;

FIG. 15 is a side elevation view of the apparatus shown in FIG. 14;

FIG. 16 is an enlarged sectional elevational view taken along line 16—16 in FIG. 13;

FIG. 24 is an axial sectional view through a gas tungsten arc welder adapted for use in the system;

FIG. 25 is a similar view of a pulsed magnetic welder adapted for use with the system;

FIG. 26 is an enlarged axial sectional view through a ring loader;

FIG. 27 is an enlarged axial sectional view through a modified end cap loader;

FIG. 28 is a schematic view illustrating insertion of an end cap; and

FIG. 29 is a similar view after the pulse magnetic welding sequence.

DETAILED DESCRIPTION OF THE INVENTION

This invention is directed to an automated fuel pin loading system for nuclear reactors. It is directed specifically toward automated fuel pin production with maximized protection against spread of contamination.

Figure 1:
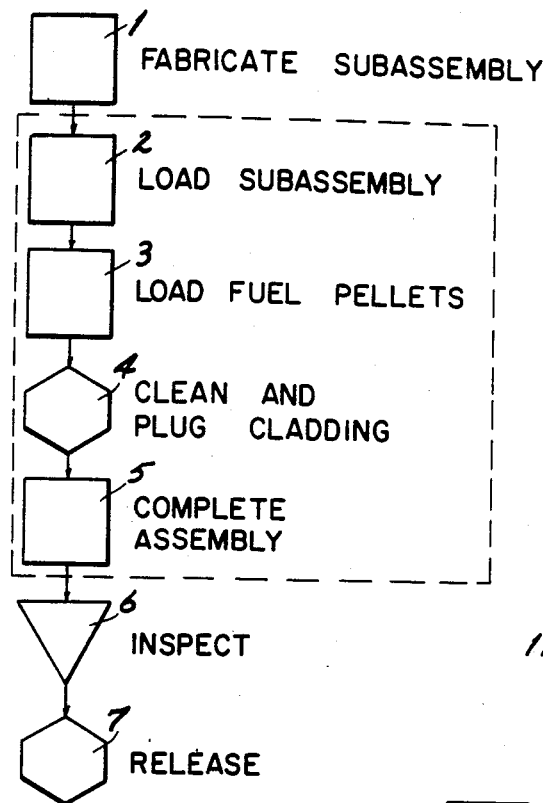
FIG. 1 is a simplified flow diagram of the system.

FIG. 1 shows the general flow path for fuel pin fabrication. The boxes bounded by dashed lines represent components of the potentially contaminated automated fuel pin loading system which is the subject of this disclosure.

Figure 2:
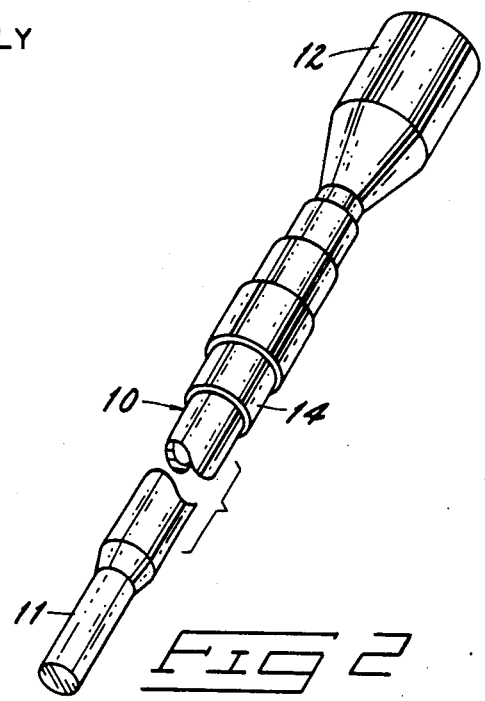
FIG. 2 is a fragmentary perspective view of the outer ends of a preassembled fuel pin prepared for the system.

A fuel pin subassembly as fabricated is shown in FIG. 2. The subassembly consists of a length of cladding 10 having a welded end cap 11, shown as the bottom end of the fuel pin, and internal non-contaminated fuel pin hardware (not shown) adjacent the welded end cap 11. A fuel loading funnel 12 is mounted to the remaining open end of the fuel cladding 10.

As shown in FIG. 4, the fuel pin subassembly funnel 12 has an enlarged outer open end that leads to a reduced diameter neck. A conical transition section connects the open end of funnel 12 to its neck. The smaller neck is at least partially inserted into the open axial end of the cladding as a coaxial extension of it. The fit between the funnel neck and the cladding interior should be reasonably close, and the thickness of the funnel neck should be minimal.

The funnel 12 is held within the length of cladding 10 by a continuous length of plastic shrink tubing 14. After placement overlapping a portion of both the funnel and cladding, the tubing 14 is shrunk diametrically by proper application of heat. It tightly encircles and grips both the cladding 10 and funnel 12. It maintains them as a unit during reception of fuel into the cladding through the funnel 12.

The funnel 12 is designed to be discarded after the length of cladding 10 has been charged with fuel pellets. Removal of the funnel is accomplished by pulling tubing 14 as cladding 10 is retracted axially. Removal is facilitated by providing a slidable collar or ring 13 that surrounds cladding 10 beneath the shrink tubing 14. The coaxial ring 13 presents a rear annular shoulder which can be engaged to pull ring 13, tubing 14 and funnel 12 as a unit. If desired, the shoulder could be presented as part of that portion of funnel 12 enveloped under the shrink tubing 14.

The tubing 14 preferably extends along the outer surface of cladding 10 as an outer protective element. It provides a cylindrical surface for engagement by resilient or inflatable seals. Particles embedded in the tubing 14 as a result of such sealing will be discarded with the tubing when it is removed. This minimizes contamination of the cladding itself.

Figure 3:
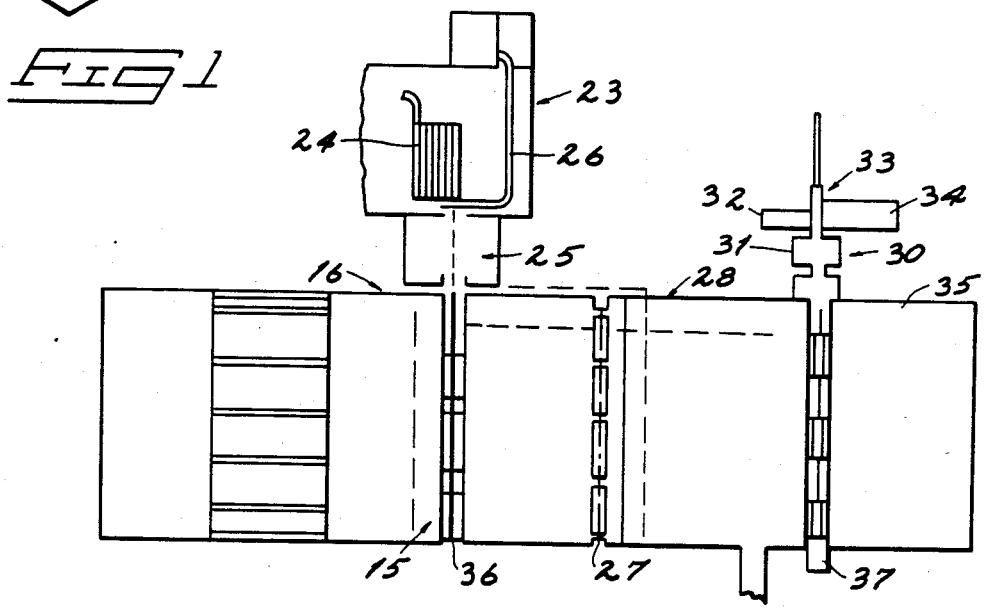
FIG. 3 is a simplified plan view of the apparatus.

Referring to the flow path shown in FIG. 1 and the associated schematic plan view shown in FIG. 3, the general steps of the process carried out by this system can be outlined. The uppermost box 1 in FIG. 1 indicates the step of fabricating the fuel pin subassembly, which is accomplished outside the scope of the present system. Box 2 of the flow diagram represents the loading or feeding of the fabricating fuel pin subassemblies into the system. This is accomplished by a cladding loader 15 comprising a suitable gravitational hopper for individually directing the lengths of fuel cladding 10 into a gravity feed conveyor shown generally at 16. The gravity feed conveyor directs parallel lengths of fuel cladding 10 from one station to the next in this system.

The individual lengths of fuel cladding 10 are next loaded with fuel pellets as required by the reactor for which they are designed. This general step is represented by box 3 in the flow diagram. It is accomplished at a pellet loading station 23. The pellet loading station 23 is environmentally isolated from the remainder of the equipment in order to prevent radioactive contamination of the conveying and handling elements which necessarily contact the fuel cladding 10. To assure against contamination, the filled lengths of fuel cladding 10 are cleaned and temporarily plugged, steps represented by box 4 in the flow diagram. These steps are carried out in a cleaning and capping unit 25 at the entrance/exit of the pellet loading station 23.

Final assembly of the fuel pin is represented by box 5, and is accomplished in an inerting enclosure 28 and welding station 30. The gas within the fuel cladding 10 is displaced by a desired inert atmosphere, the interior components of the fuel pin assembly are loaded adjacent to its open end, and the open end is sealed by a welded cap.

The boxes 6 and 7 in the flow diagram represent inspection and release steps carried out in addition to the steps of this system prior to actual usage of the fuel pins.

To complete the discussion of FIG. 3, it further represents a pellet loading tray 24 included within the pellet loading station 23. The loading tray 24 arranges individual pellets in elongated rows for insertion within individual lengths of fuel cladding. Also provided within the pellet loading station 23 is a funnel handling unit 26 which receives the funnels 12 after removal from each length of fuel cladding 10. It maintains the funnels in a guarded environment for subsequent disposal.

Interspersed along the length of the gravity feed conveyor 16 are two cladding transports 36 and 37 aligned alongside the pellet loading station 23 and the welding station 30, respectively. Transports 36 and 37 are described in detail below. They basically position individual lengths of fuel cladding 10 for axial movement relative to the gravity feed conveyor 16. They also have the capability of imparting rotational movement to the fuel cladding 10 for rotation about their individual longitudinal axes. Axial and rotational movement of the cladding is coordinated with the functions of the equipment operating at the open end of the length of fuel cladding 10 during the steps carried out within this system.

An accumulator 27 is arranged between transport 36 and the inerting enclosure 28. As will be described in greater detail below, the accumulator gathers a relatively large number of loaded lengths of fuel cladding, which are then fed as a batch into the inerting enclosure 28.

To complete the system, fuel pin storage facilities 35 are provided downstream from transport 37. They are arranged to receive the completed fuel pins from the system, holding them for subsequent inspection and eventual release.

The welding station 30, as shown schematically in FIG. 3, includes a welder 31, an end hardware loader 34, and an end cap feeder 32. Various components which must be directed into or onto the open end of each length of fuel cladding prior to welding of an end cap are moved into place by a barrel loader, generally shown at 33.

The details of the gravity feed conveyor 16 are shown in FIGS. 5 through 7 and 9. The gravity feed conveyor, which leads between the cladding loader 15 and the first cladding transport 36, is longitudinally compressed by transverse folds arranged one above the other in a zigzag path. The path is constantly inclined in a downward direction between loader 15 and transport 36. Conveyor 16 might be defined by a plurality of elongated rods arranged along the intended direction of travel of the cladding 10, by solid plates, or by a combination of rods and plates. As shown in the drawings, the lower reach of the conveyor 16 is illustrated as including top and bottom guide plates 40 which are mirror images of one another, the two plates being designed to alternately support the rolling lengths of fuel cladding 10 as the various folds along the conveyor are traversed.

The illustrated conveyor guide plates 40 are bounded along their sides by end guide plates 43 which prevent unwanted axial movement of the fuel cladding as it rolls along the supporting guide plates 40. To accommodate the radially enlarged end of each cladding subassembly presented by funnel 12, block spacers 41 are inserted between adjacent lengths of the cylindrical fuel cladding 10. The dimensions of the spacers 41 are such as to assure clearance between adjacent funnels 12 on the lengths of cladding. The spacers are identical in size and shape to assure parallel positioning and consistent, free rolling of the engaged lengths of fuel cladding 10. The block spacers 41 are preferably made of cotton or other suitable disposable material that will not damage the outer surfaces of the cladding nor substantially interfere with rolling motion of the cladding along the gravity feed conveyor 16.

The block spacers 41 slide along recessed spacer troughs 42 which extend along the lengths of the plates 40. At the end of plates 40 adjacent to the enlarged funnels 12 is provided a larger funnel trough 44, which provides clearance between the inner surfaces of guide plates 40 and the funnels 12. Thus, the lengths of cladding 10 roll along their uniform cylindrical surfaces, and are not misguided by rolling contact of the funnels 12.

The lower guide plate 40 leads to an upright transverse stop 45 which spans the width of the cladding 10. Each of the spacer troughs 42 includes an aperture 46 which serves as a spacer exit through which the block spacers 41 can freely drop into a receiving spacer collector shown at 47. The block spacers 41 drop into the collectors 47 as each length of cladding 10 is lifted from contact against the stop 45. The dropping of block spacers 41 is illustrated in dashed lines in FIG. 9.

The drawings illustrate details of one transport 36, which is designed to accommodate a single length of cladding 10. It is to be understood that multiple lengths of cladding could alternately be handled in a batch processing system by either duplicating the illustrated transport 36 or by designing transport 36 to support multiple lengths of fuel cladding simultaneously.

The details of the transports 36 and 37, which are identical in structure, are illustrated in FIGS. 6, 8, and 9. Each transport includes a reciprocable trolley adapted to selectively move in a transverse direction across the gravity feed conveyor 16. The trolley comprises an upper elongated plate 51 and a lower elongated plate 52.

Both are horizontal and one is elevationally spaced above the other.

The trolley is supported by a pair of horizontal lower guide tracks 54 mounted to a supporting stationary framework and by a similar pair of stationary tracks 57 immediately above plate 51. Slide bearings 55 provided at intervals along the length of trolley 50 engage the lower tracks 54. They are driven by threaded engagement with a transverse lead screw 56. The lead screw 56 provides powered means operably connected to trolley 50 selectively operable for shifting the transport relative to the gravity feed conveyor in a transverse direction. Similar slide bearings 58 engage the upper tracks 57 to guide the upper portions of trolley 50 for reciprocable sliding movement in the transverse direction.

Cladding support is provided on trolley 50 by paired sets of lower cladding support rollers 60 properly spaced so as to cradle each length of cladding 10 while it is positioned along a preselected operational axis defined by the longitudinal center axis of the cladding. Moveable upper support rollers 61 selectively engage the cladding 10 in opposition to the lower rollers 60 to thereby fix the cladding position on trolley 50. The upper rollers 61 are mounted on roller frames 62 which include motors (not shown) that power the rollers 61 to impart rotational movement to the lengths of fuel cladding. The cladding can therefore be selectively rotated about its central axis when desired by operation of the powered upper support rollers 61.

The roller frames 62 for the upper support roller 61 are yieldably biased to an operational or lowered position by compression spring 63. Springs 63 are interposed between each roller frame 62 and the upper elongated plate 51. The roller frames 62 are guided on the frame of trolley 50 for limited vertical movement between a released or elevated position shown in full lines in FIG. 9 and a lowered or operational position shown in dashed lines. The raising of roller frames 62 is accomplished by small powered cylinders 64 which lift the frames 62 in opposition to the forces of springs 63.

The lengths of cladding 10 are placed on the lower support roller 60 of trolley 50 by movable incline means shown as rotatable arms 65 intermittently spaced across the width of trolley 50. Arms 65 are powered for intermittent rotational movement about a transverse center axis along a common powered shaft 66. The outer ends of arms 65 include protrusions which selectively cradle each length of cladding 10 as it rests against the stop 45 across the gravity feed conveyor 16. The lower guide plate 40 of the gravity feed conveyor is provided with open recesses 67 which provide clearance for rotational pivotal movement of the arms 65 as they come upward beneath each stationary length of cladding.

After engagement of the cladding, continued rotational movement of the arms 65 permits each length of cladding to roll along the inclined upper surfaces of the arms and into engagement with the opposite protrusions at the opposite or lower arm end. Further rotational movement deposits the cladding between the lower cladding support rollers 60.

The lengths of cladding are removed from trolley 50 by a similar set of rotational arms 68 fixed to a separate powered shaft 59. The arms 68 eject each length of fuel cladding 10 and permit it to roll onto the receiving longitudinal rods or support plate surfaces of accumulator 27 (FIG. 9). The accumulator rods or plates are inclinded so as to continue gravitational movement of the cladding along the length of the system equipment.

Loading of fuel pellets is accomplished at the pellet loading station 23. Operational details of this station are illustrated in FIGS. 10, 11 and 12. The cladding 10 is inserted through a contamination boundary wall 70 and held stationary by the supporting transport 36. A complementary fuel loading tube 71 is fitted within the interior of funnel 12, minimizing free particle contamination spread. Fuel pellets (not shown) are then guided through the fuel loading tube 71 and funnel 12 to the interior of the cladding 10. The pellet load for each length of cladding 10 can be prearranged along a pellet loading tray 24 (FIG. 3). Any suitable mechanism can be used to push the row of pellets through tube 71 and into the cladding.

Contamination by release of particles is prevented by a dual seal shown in greater detail in FIG. 11. This comprises a cyclone valve 74 which surrounds an opening in the wall 70 through which the cladding 10 is projected for loading purposes. The valve 74 has a pressurized gas inlet 79 and an outlet for the resulting underflow at 76. An axial inlet 75 leading into the cyclone valve 74 surrounds the cladding 10. Air or gas outside wall 70 is drawn through inlet 75. It exhausts at 77, which draws air from within the cyclone valve 74 as well. The scrubbing action of the cyclone valve is illustrated by the arrows shown in FIG. 11.

Combined with the cyclone valve 74 is an inflatable seal 78. This includes an elastic cylindrical diaphragm 80 which can be inflated and extended radially inward by pressurized air directed to a surrounding annular groove 81. During the loading sequence, the axial position of cladding 10 is such that the adjacent end of the shrink tubing 14 is positioned within the inflatable seal 78 and is overlapped by diaphragm 80. The shrink tubing 14 thereby prevents possible embedding of particles in the outer surface of the cladding 10.

After loading of the cladding 10, it is retracted by transport 36, which draws the open end of the cladding through the boundary wall 70. As this is being accomplished, the shrink tubing 14, funnel removal ring 13 and funnel 12 are stripped from the open end of the cladding 10 by a removal clamp 82 that is movably mounted at the inner surface of wall 70 (FIGS. 10, 12). Clamp 82, which is solenoid operated, moves between a position clear of the fuel cladding 10 and a stripping position in which it straddles the shrink tubing 14 inwardly of the funnel removal ring 13. The adjacent shoulder on the funnel removal ring 13 engages the legs of the removal clamp 82 as the cladding is retracted from the pellet loading station 23, causing the shrink tubing 14, funnel removal ring 13 and funnel 12 to drop onto a receiving funnel removal tray 83. These items are then conveyed to the funnel handling unit 26 for disposal purposes.

After the open end of the cladding 10 has passed into the cyclone valve 74 during its retraction, the opening in the wall 70 can be positively sealed by a solenoid controlled gate 84. Gate 84 prevents any further release of contaminating particles from the interior of pellet loading station 23.

The cyclone valve 74 is used to strip debris from the cladding 10 as the cladding is removed from the pellet loading station 23. This is accomplished by the high velocity turbulent gas flow which surrounds the outer surfaces of the cladding 10 as indicated in FIG. 11. The cyclone valve 74 also prevents particle ejection from the interior of the pellet loading station 23. However, cleaning for smearable contamination is also required. This cleaning operation is accomplished in the cleaning and capping unit 25 (FIG. 3) and involves use of elements essentially illustrated in FIGS. 13 through 19.

Figure 18:
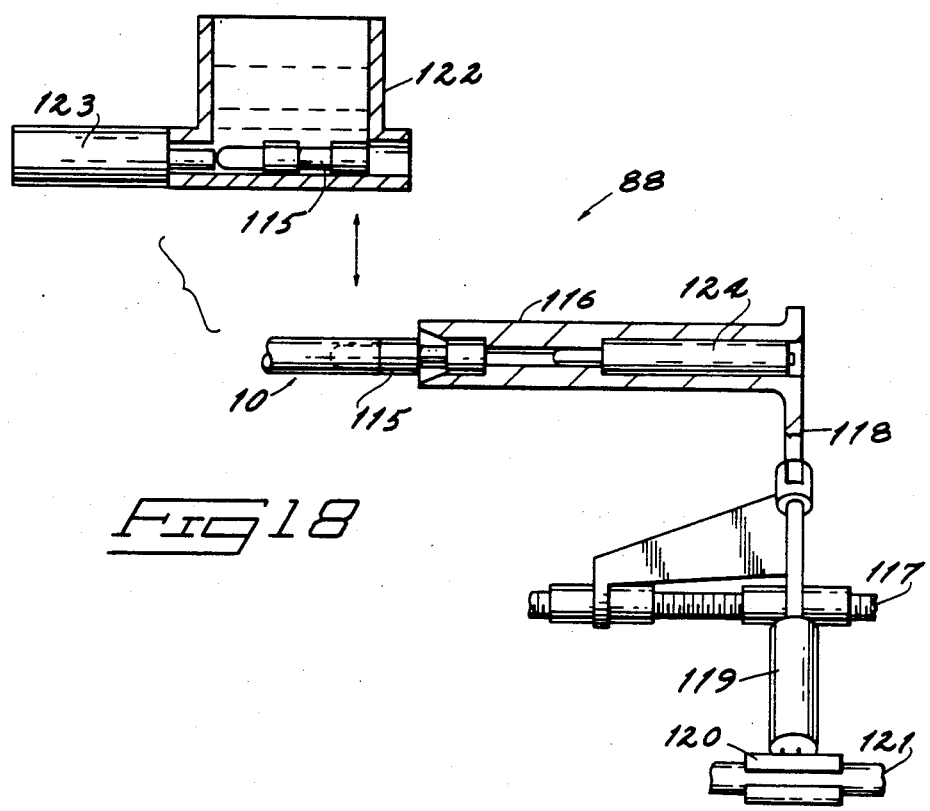
FIG. 18 is a side elevation view of the apparatus for placing a filter plug in the fuel pin.
Figure 19:
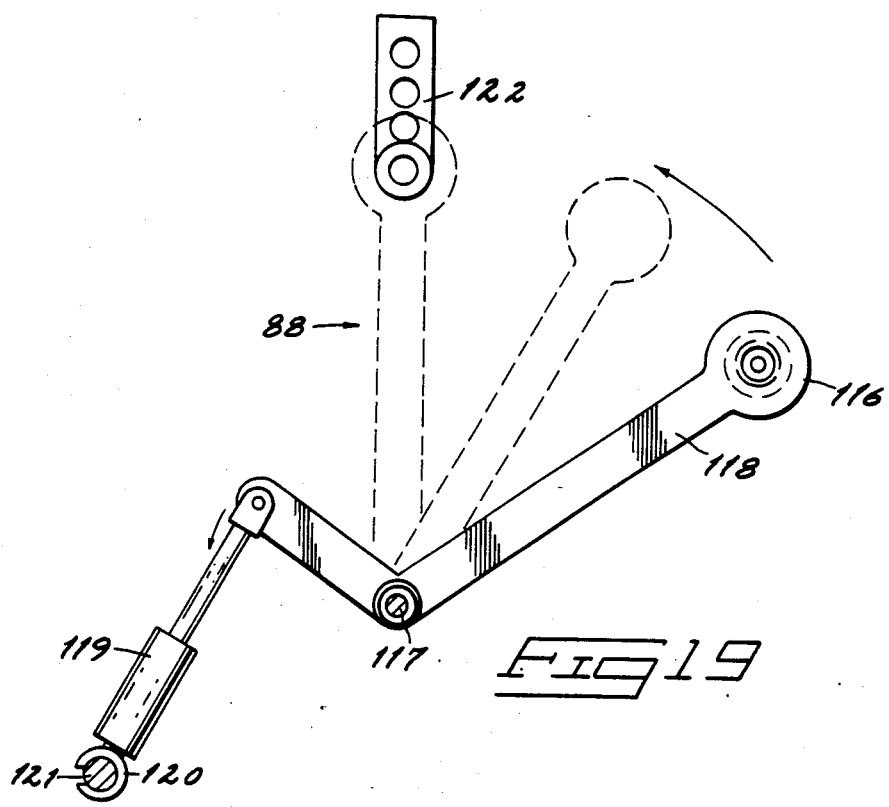
FIG. 19 is an end view of the apparatus shown in FIG. 18.
Figure 20:
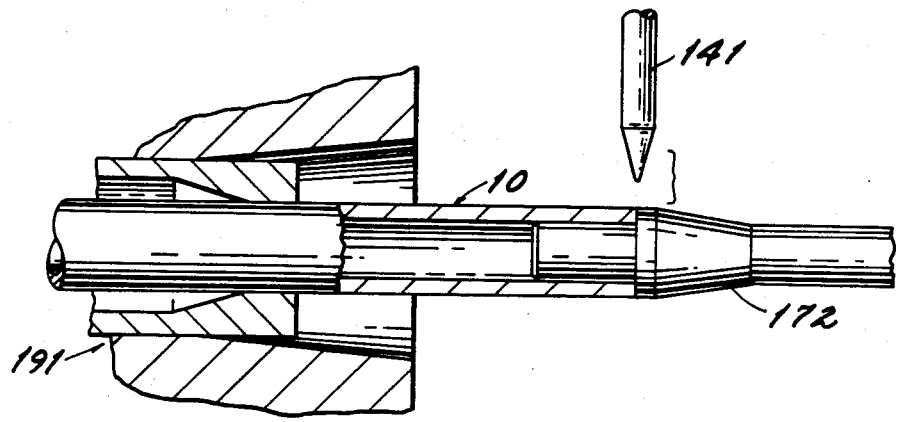
FIG. 20 is an enlarged simplified view illustrating welding of an end cap.

Referring to FIG. 13, the cleaning and capping unit is located for operation on the open end of cladding 10 between the inlet 75 of cyclone valve 74 and an apertured wall shown at 85. The equipment basically comprises an inside diameter cleaning head 86, an outside diameter cleaning assembly 87, and a capping assembly 88. The inside diameter cleaning head 86 is shown in detail in FIG. 17. The outside diameter cleaning assembly 87 is shown in FIGS. 14, 15 and 16. The capping assembly 88 is shown in FIGS. 18 and 19. The sequence of cleaning for smearable contamination is preferably to first clean the inside diameter, then the outside diameter, and finally the end of the cladding 10.

Figure 17:
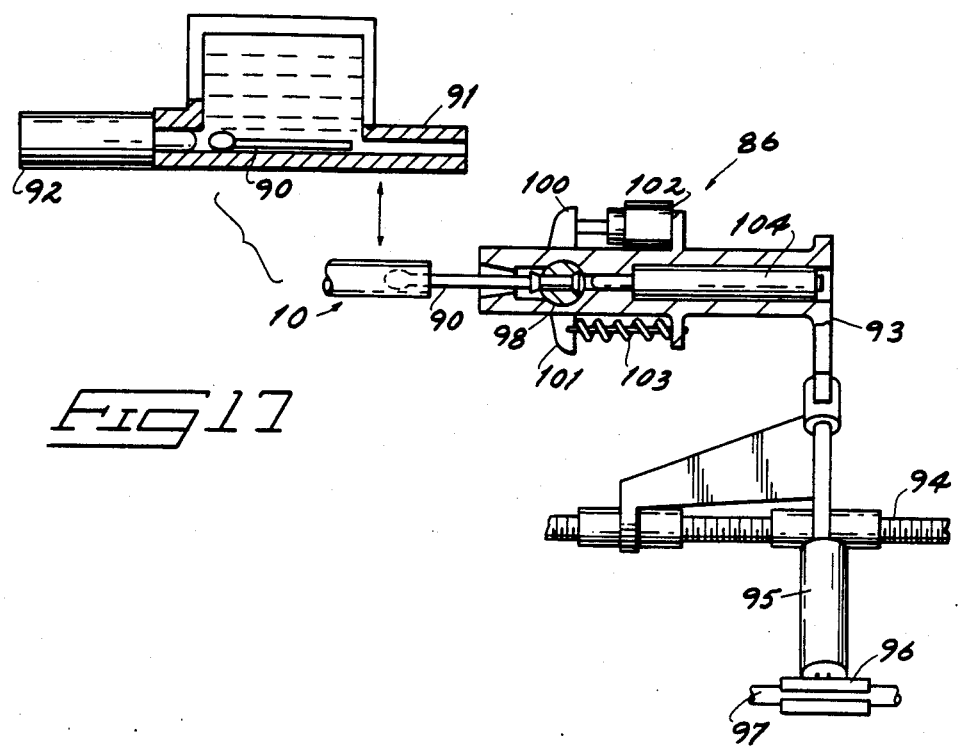
FIG. 17 is an elevational view showing the apparatus for cleaning the interior surfaces of the fuel pin.

Referring to FIGS. 13 and 17, cleaning of the inside diameter is accomplished by use of a disposable swab 90 supplied from an adjacent hopper 91 by an ejecting solenoid 92. The head 86 is movably supported on a radial arm 93 pivoted about a lead screw 94. Its angular position is controlled by a cylinder 95 operatively connected between arm 93 and a sliding bearing 96 that engages a guide rod 97. Guide rod 97 is parallel to lead screw 94. Cylinder 95 can be operated to selectively move the head 86 between a position aligned with the outlet of hopper 91 and clear of cladding 10, and an operational position coaxially aligned with the open outer end of the fuel cladding 10.

To prepare the cleaning head 86 for operational use, it must first receive a swab 90, which is clamped within head 86 by a suitable collet assembly 98. As shown, the collet assembly 98 is mounted in a pivotable bearing having opposed control lever arms 100, 101 connected to a solenoid 102 and an opposing spring 103, respectively. Spring 103 normally maintains the collet 98 in a coaxial position aligned along the center of the fuel cladding 10. Solenoid 102, when activated, moves the swab 90 angularly about the transverse axis of the collet 98.

The swab 90 is inserted into the open end of cladding 10 by operation of lead screw 94. After complete insertion, the cladding 10 will be rotated by operation of the upper support rollers 61 on the trolley 50 of transport 36. As the cladding 10 is rotated, the swab 90 will be drawn outwardly. Prior to such outward movement, the solenoid 102 is activated to pivot the swab 90 so as to frictionally engage the inner diameter surfaces of cladding 10. Once free of the cladding, the swab 90 can be ejected from the cleaning head 86 by operation of a solenoid 104. This cleaning operation can be repeated until normal removal of contamination at the interior of the cladding would be expected.

The end edge or surface of cladding 10 is basically cleaned in the same manner as the inner diameter, again by use of swabs 90 and the cleaning head 86. The only difference is that the solenoid 102 is activated prior to engagement of the cladding 10 by swab 90. This pivots the outer end of swab 90 into position to engage the end edge of the cladding 10 as the cladding is being rotated.

Cleaning of the outside diameter of cladding 10 is accomplished by use of disposable pads 105 supplied from a hopper 109 to the outside diameter cleaning assembly 87. A movable cleaning head 106 is supported for movement parallel to the cladding 10 by a lead screw 107 and parallel guide rod 108. Individual cleaning pads 105 are supplied from the hopper 109 by a solenoid-operated injector 110 which feeds the pads singly over the cladding 10 into a spring clamp assembly 111. The outside diameter cleaning assembly clamp 112 is then moved over the pad 105 by lead screw 107. Clamp 112 is operated by solenoid 113. It encircles the length of cladding 10 and firmly holds the slotted pad 105 about its exterior diameter.

Once a cleaning pad 105 is securely gripped within clamp 112, lead screw 107 can be operated to draw the cleaning head 106 outwardly along the cladding as the cladding rotates. After passing beyond the open end of cladding 10, the pad will be discharged by release of solenoid 113 and operation of an ejecting solenoid 114. The cleaning head 106 can then be reciprocated back to its initial position adjacent to wall 85, where it can receive a subsequent pad 105 and the procedure be repeated. This process can be repeated as many times as required to achieve a clean condition.

After cleaning of the open end of the fuel cladding 10, suitable monitors (not shown) can be translated along the cladding axis to evaluate its state of cleanliness. Based upon such an examination, a determination as to the need for further hand cleaning can be made. Assuming that hand cleaning is not required, a filter plug 115 is loaded into the open end of fuel cladding 10 by a capping assembly 88. The plug loader 116 of capping assembly 88 is supported on an arm 118 and lead screw 117 in essentially the same manner as previously described with respect to the cleaning head 86. Arm 118 is angularly positionable about the axis of lead screw 117 by operation of a cylinder 119. The cylinder 119 is supported by a slidable bearing 120 movably supported on a parallel guide rod 121.

The plugs 115 are supplied from a hopper 122. They are ejected by a solenoid 123. After receiving a plug 115, the plug loader 116 is pivoted into an operational position coaxial with the open outer end of the clean cladding 10. An ejecting solenoid 124 within the plug loader 116 is selectively operational to frictionally insert the filter plug 115 within the open end of cladding 10.

With filter plug 115 in place, the fuel pin subassembly is then clean relative to the gravity feed conveyor 16. However, a suitable preferred gas flow path and hood arrangement can enclose the gravity feed system as a secondary contamination boundary. Such a hood is schematically illustrated in FIG. 5 by the dashed lines 125.

After the pellet loading process and cladding cleaning steps have been accomplished, the fuel pin subassemblies are individually removed from trolley 50 on transport 36 by operation of rotatable arms 68. They are permitted to roll along the receiving guide supports 126 of gravity feed conveyor 16 to a solenoid operated transverse stop 127 (FIG. 5). Stop 127 acts as an accumulator to gather the requisite number of fuel pin subassemblies for an inerting sequence.

Inerting of the fuel pin subassemblies is accomplished in a batch sequence. It is performed within a rectangular pressure vessel schematically shown at 130 (FIG. 5). The inlet to the vessel 130 includes a solenoid actuated sealable door 131. A similar door 132 is provided at its outlet. The gravity feed conveyor, which extends through the vessel 130, maintains a minimum nuclear cross section from a criticality viewpoint. However, other arrangements of the inerting vessel are capable of being substituted in the system, such as a barrel arrangement set to one side of the principal conveyor path.

After the predetermined charge of fuel pin subassemblies is contained within the pressure boundaries of vessel 130, the vessel and its contents can be evacuated and backfilled with the desired inerting gas. In a typical operational system, several hundred fuel pins might be inerted in a single batch, and the process might require several hours. Multiple vessels 130 can be interchanged within the system, depending upon production speed requirements. It should be noted that during the evacuation process, contamination by gas removal from the fuel pin subassemblies is prevented by the filter plugs 115.

Following the inerting procedures, each fuel pin subassembly is directed to transport 37, which supports the cladding 10 for axial transverse movement relative to the gravity feed conveyor and for rotational movement about the cladding axis. While the cladding is positioned by transport 37, the filter plug 115 is removed, the reflector assemblies (if any) are inserted within the cladding, and an end cap is welded at the open end of the cladding to complete the fuel pin assembly.

FIG. 24 shows a first welder capable of being used in the system. It makes use of a gas tungsten arc (GTA) welding system. The general details of the welder 31 are conventional. It should be noted that prior efforts to automate applications of a GTA welder for fuel pin usage have been limited due to electrode tip maintenance, which is sometimes required after welding of each individual fuel pin. This problem is overcome in the present system by providing an electrode drive mechanism 140 (FIG. 24) that can selectively move the tip of electrode 141 radially inward toward the operational axis of the welder 31. A rotatable grinder 142 is also selectively movable in a radial direction along an axis coaxial with the electrode 141. Grinder 142 is shaped to grind the electrode tip to the desired tip configuration as grinder 142 reaches a preselected stop position. Grinder 142 is operated to refurbish the electrode 141 after each fuel pin welding sequence, thereby eliminating the need for manual adjustment or checking of the electrode tip condition.

As shown in FIG. 24, the incoming cladding 10 is directed by the supporting transport 37 to a sealed chamber 143 in communication with the inerting vessel 130. The transport 37 first positions the filter plug 115 directly beneath a retractable end plug remover 144. The end plug remover 144 includes a downwardly open C-clamp 145 which is complementary to an annular groove formed about the exterior of the filter plug 115. A solenoid or air cylinder 146 is selectively operable to position C-clamp 145 about the plug 115 with the surfaces of the C-clamp 145 engaging the shoulders of the plug groove. Transport 37 can then be operated to retract cladding 10, which allows plug 115 to fall into a capture tube 147.

After removal of filter plug 115 has been completed, transport 37 is operated to axially shift the open end of cladding 10 into the welder 31. Cladding 10 is radially positioned and gripped by a bellows-operated collet 191 rotatably journalled within the welder 31 by bearings shown at 192. Thus, as cladding 10 is rotated by operation of transport 37, the collet 191 clamped to it will be freely rotated about its coaxial axis on the welder while providing axial and longitudinal support adjacent to the open end of cladding 10. After welding, the collet 191 is freed and seal 190 is released. The fuel pin can then be retracted through chamber 143 by operation of the transport 37.

The cylindrical surfaces of cladding 10 can be sealed by an inflatable seal 190. The seal 190 includes a yieldable membrane which can be pressurized by air directed about a surrounding groove. Seal 190 is not required during operation of the GTA welder, but is utilized to seal off the interior of the welder 31 and barrel loader 33 from enclosure 28 during inerting operations. This can be accomplished by feeding a dummy pin into the welder and operating seal 190 to thereby close off the entrance into the inerting enclosure 28. By providing each batch of fuel pin assemblies with a final dummy pin for this purpose, the necessity of carrying out the inerting steps throughout the greater volume of the welder and loading equipment is prevented. After inerting has been accomplished, seal 190 can be relaxed. The atmospheres within the welder and loading equipment will be maintained as an inert atmosphere at all times.

With the open end of cladding 10 located within the chamber 143, various barrel loaders can be directed through the welder 31 and into chamber 143 for placement of reflectors, tag gas capsules and other internal or external elements required to complete assembly of the fuel pin.

Figure 21:
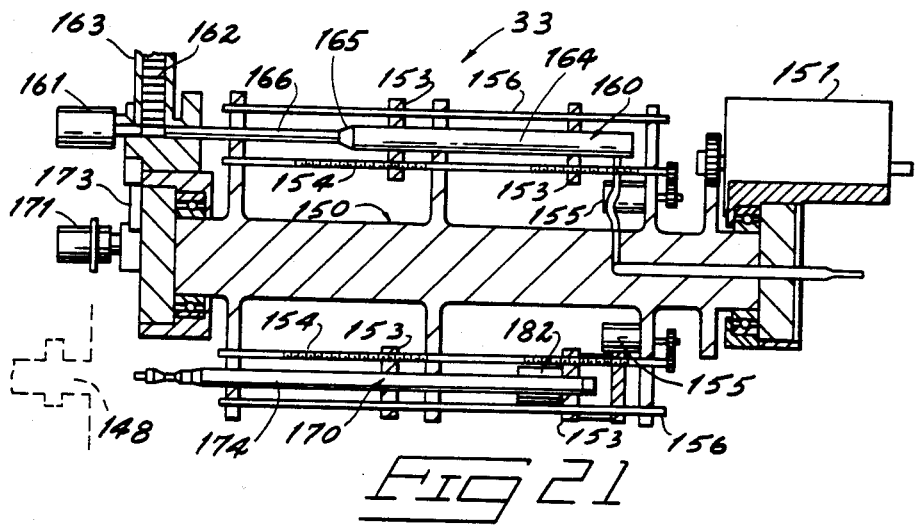
FIG. 21 is an axial sectional view of a barrel loader.

General details of a barrel loader for inserting reflectors and end caps are shown in FIG. 21. A rotatable barrel frame 150 is shown supporting a reflector loader 160 and a diametrically opposite end cap loader 170. The details of loaders 160 and 170 are shown respectively in FIGS. 22 and 23.

The barrel frame 150 is rotatably supported about an axis parallel to the axes of the loaders 160 and 170. It can be indexed about its axis to coaxially align alternate loaders 160 and 170 along the axis of welder inlet 148. The loader 160 is alternately aligned coaxially with a reflector injector 161 which receives reflectors 162 from a reflector hopper 163. Similarly, the end cap loader 170 can be indexed about the axis of the barrel frame 150 to align it coaxially with an end cap injector 171 which receives end caps 172 from a hopper 173 located to the rear of the view shown in FIG. 21.

Figure 22:
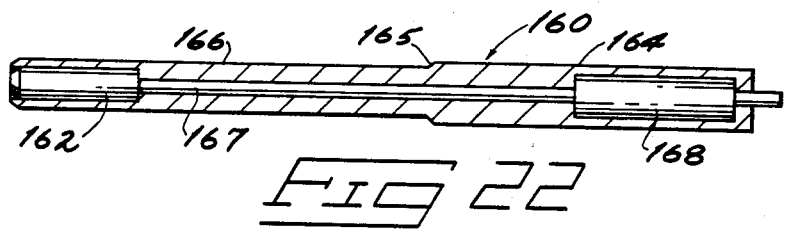
FIG. 22 is an enlarged axial sectional view of an apparatus for inserting a reflector or other component into a fuel pin.

The reflector loader 160 comprises a tubular guide 164 having a shoulder 165 complementary in size and shape to the interior of the welder inlet 148 as shown in FIG. 22. A coaxial extension 166 protrudes from guide 164 and is insertable within the cladding 10. It includes an outer cavity which frictionally holds a reflector 162 for insertion purposes. A reciprocable plunger 167 is powered by a double acting pneumatic cylinder 168 operatively connected to a source of air mounted on the barrel frame 150.

Figure 23:
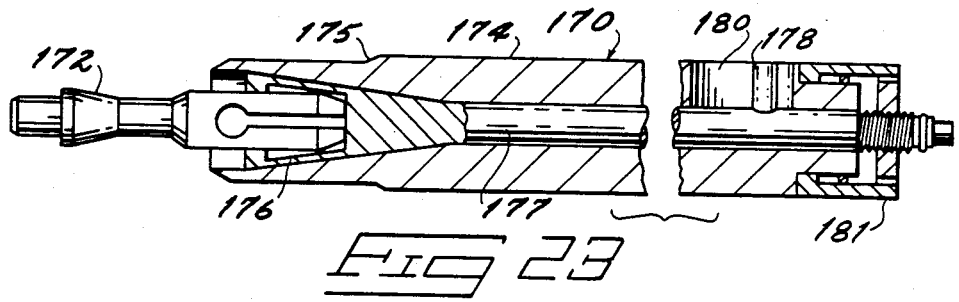
FIG. 23 is an enlarged fragmentary sectional view of an apparatus for inserting an end cap.

The details of the end cap loader 170 are shown in FIG. 23. It also includes a guide 174 having a shoulder 175 that fits within the welder inlet 148. No extension is provided on guide 174, since the end cap 172 is inserted directly at the open end of cladding 10 prior to welding. The end caps 172 are individually held by a collet including gripping spring fingers 176 at the end of a shaft 177 which is reciprocable within guide 174. Relative rotation between shaft 177 and guide 174 is prevented by interengagement between a radial pin 178 on the shaft 177 and a receiving longitudinal slot 180 formed through the guide 174.

The guide 174 acts as a locking sleeve to urge the collet fingers 176 radially inward against the surfaces of end cap 172. This is accomplished by an abutting collar 181 threadably engaged about the outer end of shaft 177. Collar 181 is selectively rotatable by operation of a drive motor 182 (FIG. 21) operably connected to the collar 181. It can be operated to grip and lock an end cap 172, or to alternately release the end cap after the welding step has been completed.

Both loaders 160 and 170 are mounted on the barrel frame 150 for free rotation about their individual axes, as well as for reciprocating movement parallel to their respective axes. The guides 164 and 174 include integral supporting bearings 153 which surround them and receive threaded lead screws 154 powered by longitudinal drive motors 155 operably connected to them by suitable drive gears. The bearings 153 also receive stationary guide rods 156 which stabilize their longitudinal movement as imparted by rotation of the respective lead screws 154. Each of the loaders 160 and 170 are movable between a retracted position, as shown in FIG. 21, and an extended operational position at which the shoulders 165 or 175 abut the interior of the welder inlet 148.

After the filter plug 115 has been removed from the outer end of cladding 10 by operation of C-clamp 145, the barrel frame 150 is rotated by barrel drive 151 to properly index the reflector loader 160 in a coaxial position aligned with the welder inlet 148. The loader 160 is then shifted along its axis to bring shoulder 165 into engagement with the interior of inlet 148. At this time, the extension 166 will protrude to the open end of cladding 10, previously positioned within the welder 31. Extension 166 locates reflector 162 inwardly from the open end of the cladding, leaving clearance between the reflector and the subsequently added end cap 172. Reflector 162 is then injected into the cladding 10 by operation of cylinder 168 and plunger 167.

After retraction of plunger 167, the reflector loader 160 is reciprocated clear of the welder inlet 148, and barrel frame 150 is again indexed by operation of barrel drive 151. The end cap loader 170, which had previously received an end cap 172, is subsequently aligned with the welder inlet 148. It is also reciprocated along its axis by the associated lead screw 154, bringing shoulder 175 into abutment with the interior of welder inlet 148. At this point, the projecting end cap 172 will be partially inserted within the interior of the cladding 10, with both the end cap 172 and cladding 10 properly positioned for operation of welder 31. As welder 31 is operated, the cladding 10 will be rotated about its longitudinal axis by operation of transport 37. End cap 172 will freely rotate in unison with it, allowing a complete circumferential weld to be formed about cladding 10 and end cap 172. When the welding sequence is finished, the collet fingers 176 within the end cap loader guide 174 are selectively released, permitting loader 170 to be retracted. The completed fuel pin assembly is now withdrawn from welder 31 by operation of transport 37. It can be discharged into fuel pin storage 35 for cleaning and subsequent inspection.

An alternate form of welder 31 is shown in FIG. 25. It utilizes a ring loader exemplified by the device shown in FIG. 26 and a slightly modified end cap loader illustrated in FIG. 27. The details of the welding sequence are shown in FIGS. 28 and 29.

Referring to FIG. 25, an opening is provided in communication with the interior of chamber 143 through an inflatable seal 193. This seal includes a flexible circumferential membrane that is selectively urged radially inward by pressurized air directed about an annular groove in a supporting sleeve 194. Seal 193 is capable of isolating the environment within chamber 143 from the environment within the welder.

The welder 31 in this instance comprises a conventional pulsed magnetic welder of a cylindrical nature. It is arranged coaxially about a tube 195 having an inner diameter capable of receiving the cladding 10.

In order to effect a weld by magnetic pulse, it is necessary to place a ring of curie metal about the area on cladding 10 which is to be welded. The magnetic material of ring 217 is thereby collapsed about the cladding as a result of the magnetic pulse produced by the welder. The resulting inward movement of the cladding surfaces causes development of a cold weld at the end of the cladding.

Ring 217 is loaded on a guide 218 having a tapered nose 220 adapted to center the guide 218 coaxially in the open end of cladding 10. A radial shoulder 221 is adapted to abut the outer end edge of the cladding. The welding ring 217 can then be pushed onto the cladding by an abutting welding ring compressor 223. The welding ring compressor 223 is an extension of a loading rod 224 which is mounted to the barrel loader in the same manner as is the end cap loader and reflector loader. It is movable axially relative to the barrel loader and relative to the welder.

One significant advantage of using pulsed magnetic welding techniques for closing the end of the fuel pin is that the welding can take place within a very confined area in tube 195. Because of the relatively small excess volume required in the welding area of this equipment, relatively expensive tag gas for identification of a fuel pin can be directed into tube 195 and the open end of cladding 10 prior to welding. This eliminates the fabrication and handling expenses of the usual tag gas capsules that are typically placed in the fuel pins and subsequently ruptured. The tube 195 includes a tapered shoulder 197 leading to an enlarged diameter groove 198 provided with a connection 200 for entrance of tag gas and a connection 201 for application of vacuum pressure. The connections 200 and 201 permit introduction of any gaseous environment desired, and alternation of the introduction of gas and vacuum pressure.

The area within the welder 31 is sealed by a second inflatable seal 202. The diameter of seal 202 is complementary to the outer diameter of the bottom end cap loader used in conjunction with this equipment. The outer end of tube 195 is open and serves as a welder inlet. It is identified by the reference numeral 203.

The end cap loader 209 provides for introduction of tag gas directly in the weld area. The guide 204 has an extension sleeve 211 slidably mounted over its outer end biased outwardly by a compression spring 212 wrapped about guide 204. Spring 212 normally maintains the sleeve 211 in the extended position shown in FIGS. 27 and 28. In this position, the fuel pin end cap 213 is retracted within the outer end of sleeve 211. The sleeve 211 includes apertures 214 which permit entrance of tag gas to the interior of sleeve 211. The sleeve 211 and guide 204 are sealed with respect to each other and with respect to shaft 207 by seals shown at 215 and 216.

After the end cap loader has received and gripped an end cap 213, it is positioned coaxially with the welder inlet and shifted axially until the outer end of sleeve 211 engages the tapered shoulder 197 within tube 195. Seal 202 can then be engaged about sleeve 211, thereby defining a small volume sealed area between the seal 193 that encircles cladding 10 and the seal 202 that encircles sleeve 211. Tag gas is added to the atmosphere within the welder through the connection shown at 200.

After addition of the tag gas, the barrel loader shifts the shaft 207 and end cap 213 into welding position within the open end of the cladding. An outwardly tapering surface formed on the end cap 213 is located radially inward of the ring 217. Ring 217 is collapsed about the cladding 10 and end cap 213 by a strong momentary magnetic pulse. The acceleration of the cladding as it collapses about the tapered surface on end cap 213 creates a cold weld at the outer edge of the cladding, sealing the cladding to the solid metal end cap 213 (FIG. 29). The collet fingers 206 can be released and end cap loader 209 can be retracted from the welder inlet to complete the welding sequence.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments discussed in detail were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. In an automated loading apparatus for nuclear reactor fuel pins:
   gravity conveyor means for rolling parallel fuel pin assemblies along an inclined path perpendicular to their lengths;
   transversely movable transport means interposed in said path; said transport means including transversely spaced fuel pin supports for coaxially positioning a fuel pin assembly along a preselected operational axis;
   transfer means movably mounted relative to both said conveyor means and said transport means for selectively engaging and moving individual fuel pin assemblies between said conveyor means and the supports of said transport means;
   powered means mounted on said transport means for selectively shifting the transport means relative to said conveyor means in a transverse direction that is parallel to said operational axis;
   fuel pin handling means at a location transversely adjacent to one side of the conveyor means and intersected by said operational axis for selectively receiving one end of a fuel pin assembly shifted thereto by operation of said powered means; and
   roller means mounted on said supports for selectively imparting rotational movement to a fuel pin assembly about said operational axis while the fuel pin assembly is positioned by said supports.

2. The automated loading apparatus of claim 1, wherein said transfer means comprises:
   stop means located at a position adjacent said transport means in the path of the fuel pin assemblies rolling along said conveyor means for selective engagement by an individual fuel pin assembly;
   and movable incline means for selectively shifting a fuel pin assembly from engagement with the stop means and for causing it to roll onto said supports of said transport means.

3. The automated loading apparatus of claim 1, wherein the fuel pin handling means comprises:
   means for inserting a charge of fuel pellets into a fuel pin assembly shifted thereto.

4. The automated loading apparatus of claim 1, wherein the fuel pin handling means comprises:
   means for cleaning one end of a fuel pin assembly shifted thereto.

5. The automated loading apparatus of claim 1, wherein the fuel pin handling means comprises:
   means for inserting a charge of fuel pellets into one end of a fuel pin assembly shifted thereto;
   means for closing and welding the end of a fuel pin assembly shifted thereto.

6. In an automated loading apparatus for nuclear reactor fuel pins:
   a loading hopper for storing a plurality of partially completed fuel pin assemblies each including a length of cylindrical cladding having an enlarged funnel removably mounted at one open end of the cladding and an end cap welded at its remaining end;
   gravity feed conveyor means leading outward from the loading hopper for permitting controlled rolling motion of parallel fuel pin assemblies on inclined support rails arranged perpendicular to the lengths of said fuel assemblies;
   first and second transversely movable transport means interposed along said gravity feed conveyor means, each transport means including transversely spaced fuel pin supports for coaxially positioning a fuel pin assembly along a preselected operational axis;
   separate transfer means for selectively moving individual fuel pin assemblies between said gravity feed conveyor means and each of said first and second transport means;
   separate powered means operably mounted on each transport means selectively operable for shifting the transport means relative to said gravity feed conveyor means in a direction parallel to its operational axis;
   a fuel pin loading station transversely adjacent to said gravity feed conveyor means and interesected by said operational axis of said first transport means for selectively receiving said one open end of a fuel pin assembly shifted thereto by operation of said powered means while positioned on said supports of the first transport means;
   a fuel pin welding station transversely adjacent to said gravity feed conveyor means and intersected by said operational axis of said second transport means for selectively receiving said one open end of a fuel pin assembly shifted thereto by operation of said powered means while positioned on said supports of the second transport means;
   an enclosure containing means for inserting a charge of fuel pellets into each fuel pin assembly through the enlarged funnel mounted thereto while said one end of the fuel pin assembly is held at a loading position within the enclosure by said first transport means;
   and funnel removal means contained within the enclosure in the path of each fuel pin assembly as it is shifted parallel to the operational axis of the first transport means following its receipt of a charge of fuel pellets for engaging and stripping the enlarged funnel from said one end of the fuel pin assembly.

7. The automated loading apparatus of claim 6 wherein the fuel pin loading station comprises:
   an enclosure containing means for inserting a charge of fuel pellets into each fuel pin assembly through the enlarged funnel mounted thereto while said one end of the fuel pin assembly is held at a loading position within the enclosure by said first transport means;

and funnel removal means contained within the enclosure in the path of each fuel pin assembly as it is shifted parallel to the operational axis of the first trolley following its receipt of a charge of fuel pellets for engaging and stripping the enlarged funnel from said one end of the fuel assembly; and means contained within the enclosure for wiping any contaminants from the surfaces of said one end of each fuel fin assembly after stripping of the enlarged funnel mounted thereto.

8. The automated loading apparatus of claim 6 wherein the fuel pin loading station comprises:

an enclosure containing means for inserting a charge of fuel pellets into each fuel pin assembly through the enlarged funnel mounted thereto while said one end of the fuel pin assembly is held at a loading position within the enclosure by said first transport means; and sealing means in one wall of the enclosure traversing the operational axis of said first trolley means for preventing contaminants from escaping about a fuel pin assembly extending through the sealing means while selectively permitting translational and/or rotational motion of the fuel pin assembly relative to the operational axis of said first transport means.

9. The automated loading apparatus of claim 6 wherein the fuel pin loading station comprises:

an enclosure containing means for inserting a charge of fuel pellets into each fuel pin assembly through the enlarged funnel mounted thereto while said one end of the fuel pin assembly is held at a loading position within the enclosure by said first transport means;

and funnel removal means contained within the enclosure in the path of each fuel pin assembly as it is shifted parallel to the operational axis of the first trolley following its receipt of a charge of fuel pellets for engaging and stripping the enlarged funnel from said one end of the fuel assembly;

means contained within the enclosure for wiping any contaminants from the surfaces of said one end of each fuel fin assembly after stripping of the enlarged funnel mounted thereto; and means for applying a cap to said one end of each fuel pin assembly after wiping thereof.

* * * * *